(12) United States Patent
Herden et al.

(10) Patent No.: US 8,701,613 B2
(45) Date of Patent: Apr. 22, 2014

(54) LASER IGNITION PLUG WITH AN ANTECHAMBER

(75) Inventors: Werner Herden, Gerlingen (DE); Martin Weinrotter, Vitoria-Gasteiz (ES); Pascal Woerner, Korntal-Muenchingen (DE); Juergen Raimann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/640,852

(22) PCT Filed: Mar. 23, 2011

(86) PCT No.: PCT/EP2011/054404
§ 371 (c)(1),
(2), (4) Date: Dec. 24, 2012

(87) PCT Pub. No.: WO2011/128190
PCT Pub. Date: Oct. 20, 2011

(65) Prior Publication Data
US 2013/0199483 A1 Aug. 8, 2013

(30) Foreign Application Priority Data
Apr. 13, 2010 (DE) .................... 10 2010 003 899

(51) Int. Cl.
*F02P 23/04* (2006.01)
(52) U.S. Cl.
USPC ...................................... 123/143 B; 123/260
(58) Field of Classification Search
USPC .............. 123/143 B, 260, 266, 268, 286, 293
See application file for complete search history.

(56) References Cited

U.S. PATENT DOCUMENTS

| 4,930,473 | A  | * | 6/1990  | Dietrich ......................... 123/266 |
| 7,100,567 | B1 | * | 9/2006  | Bailey et al. ................... 123/268 |
| 7,798,118 | B2 | * | 9/2010  | Gagliano et al. ............... 123/266 |
| 7,856,956 | B2 | * | 12/2010 | Inoue et al. .................... 123/267 |
| 8,350,457 | B2 | * | 1/2013  | Thomas et al. ................. 313/143 |
| 8,459,222 | B2 | * | 6/2013  | Weinrotter et al. ....... 123/143 B |
| 2009/0107436 | A1 |   | 4/2009 | Schultz |
| 2010/0147259 | A1 | * | 6/2010 | Kuhnert et al. ............... 123/260 |

(Continued)

FOREIGN PATENT DOCUMENTS

DE 10 2006 018 973 A1 10/2007
DE 10 2007 015 036 A1 10/2008

(Continued)

OTHER PUBLICATIONS

International Search Report corresponding to PCT Application No. PCT/EP2011/054404, mailed Jun. 27, 2011 (German and English language document) (7 pages).

*Primary Examiner* — Erick Solis
(74) *Attorney, Agent, or Firm* — Maginot, Moore & Beck

(57) ABSTRACT

A laser ignition plug includes an antechamber into which the laser ignition plug is configured to irradiate laser radiation. The antechamber defines at least two overflow ducts that realize a fluid connection between the antechamber and a spatial region surrounding the antechamber. The at least two overflow ducts, with regard to one or more of (i) the radial spacing thereof from a longitudinal axis of the antechamber, (ii) the axial spacing thereof from an end region, which faces toward the combustion chamber, of the antechamber, and (iii) the alignment and/or geometry thereof, are arranged asymmetrically with respect to the longitudinal axis of the antechamber.

15 Claims, 3 Drawing Sheets

(56) References Cited

U.S. PATENT DOCUMENTS

2011/0120404 A1* 5/2011 Weinrotter et al. ....... 123/143 B
2012/0060791 A1* 3/2012 Woerner et al. ............ 123/260
2012/0304959 A1* 12/2012 Weinrotter et al. .......... 123/260

FOREIGN PATENT DOCUMENTS

| FR | 2 873 763 A1 | 2/2006 |
| WO | 2004/036709 A1 | 4/2004 |
| WO | 2010/007066 A1 | 1/2010 |

* cited by examiner

LASER IGNITION PLUG WITH AN ANTECHAMBER

This application is a 35 U.S.C. §371 National Stage Application of PCT/EP2011/054404, filed on Mar. 23, 2011, which claims the benefit of priority to Ser. No. DE 10 2010 003 899.7, filed on Apr. 13, 2010 in Germany, the disclosures of which are incorporated herein by reference in their entirety.

BACKGROUND

The disclosure relates to a laser ignition plug and to an internal combustion engine.

Internal combustion engines which ignite an air/fuel mixture present in a combustion chamber by means of an antechamber are known. DE 10 2006 018 973 A1 describes a laser ignition system in an antechamber of a combustion engine with a centrally arranged laser ignition device.

SUMMARY

The problem addressed by the disclosure is solved by a laser ignition plug and by an internal combustion engine. Advantageous developments are disclosed in the dependent claims.

In accordance with the disclosure, the antechamber of the laser ignition plug has at least two overflow ducts, which, with regard to the radial spacing thereof from a longitudinal axis of the antechamber and/or the axial spacing thereof from an end region, which faces the combustion chamber, of the antechamber and/or with regard to the alignment and/or geometry thereof, are arranged asymmetrically with respect to the longitudinal axis of the antechamber.

This takes into account the fact that laser ignition plugs, together with the associated antechamber, often are not arranged exactly coaxially with a longitudinal axis of a cylinder or combustion chamber formed therein. In conventional systems, different path lengths for the ignition torches exiting from the antechamber in the direction of wall portions of the cylinder or combustion chamber thus develop disadvantageously alongside an accordingly sub-optimal ignition. By contrast, by means of the asymmetrical arrangement of the overflow ducts according to the disclosure, a large number of embodiments of overflow ducts are provided in order to ignite the fuel in a more uniform manner, even in conventional internal combustion engines with asymmetrical installation of the ignition plug. More simply, due to the combination of features of the disclosure, the lengths of the ignition torches are adapted to the path lengths between the antechamber and the wall portions of the combustion chamber by means of a specific embodiment of the overflow ducts.

The laser ignition plug and the antechamber preferably form a structural unit. In accordance with the disclosure, it is also possible however to provide the laser ignition plug and the antechamber as separate elements.

The laser ignition plug according to the disclosure has the advantage that ignition torches can exit from its antechamber in different ways, such that a fuel or fuel mixture can be burned through uniformly, in spite of different path lengths between the laser ignition plug or the antechamber and an opposite wall portion of the combustion chamber. The burning time can be reduced, thus resulting in improved efficiency. The thermal losses of the combustion chamber and a knocking tendency of the internal combustion engine can be reduced by achieving quicker burn-through, wherein the end gas has less time to ignite.

In accordance with one embodiment, at least two overflow ducts are arranged asymmetrically with respect to a radial spacing from the longitudinal axis of the antechamber and/or with respect to an axial spacing from an end region, which faces the combustion chamber, of the antechamber. Due to a respective structural arrangement of one or more overflow ducts in a wall of the antechamber, properties of the ignition torches can thus advantageously be adapted to the combustion chamber of the target system.

In accordance with a further embodiment, at least two overflow ducts are aligned asymmetrically with respect to the longitudinal axis of the antechamber. For example, longitudinal axes of the overflow ducts or surface normals of an outer opening in the overflow ducts may each be arranged at different angles to the longitudinal axis of the antechamber. The ignition torches exiting from the antechamber accordingly point in different spatial directions of the combustion chamber, asymmetrically in relation to the longitudinal axis of the antechamber. Asymmetrically directed ignition torches can thus be produced accordingly, and the laser ignition plug and the antechamber are thus advantageously adapted to an asymmetry of the combustion chamber or of an installed position of the laser ignition plug or of the antechamber.

In accordance with a further embodiment, at least two overflow ducts are arranged and/or designed asymmetrically in terms of their geometry with respect to the longitudinal axis of the antechamber. For example, the overflow ducts can thus be optimized with respect to their cross-sectional shape or their diameter or their cross-sectional area or a ratio of their axial length and their cross-sectional area. Generally, an impulse of an ignition torch and accordingly an achievable torch length increases with a larger cross-sectional area of the overflow duct. The maximum achievable torch length also depends on a pressure and a temperature in the combustion chamber, and on a fuel/air mixture. This relationship can preferably be established from measured variables and/or by calculations by means of analysis of the course of the burning process and/or simulations.

The disclosure also proposes the fact that a cross-section of at least one overflow duct has different cross-sectional areas and/or cross-sectional shapes along a longitudinal axis of the overflow duct. Further variants are thus defined in order to set a length of an ignition torch in accordance with the disclosure and to improve the function of the laser ignition plug. For example, the cross-sectional shape of one or more overflow ducts can be circular, elliptical or rectangular, at least in portions. The cross-sectional areas of the overflow ducts and/or the cross-sectional shapes can also vary in practically any manner along the longitudinal axis of the overflow duct. If an overflow duct does not have a longitudinal axis directed in a straight line, the "longitudinal axis" can be understood to be a spatially curved line, which extends through respective centroids of the cross-sectional areas.

In accordance with a further embodiment of the disclosure, at least one overflow duct basically has the geometry of a cone. It is thus advantageously made possible, in a simple manner, to affect the shaping of the ignition torches in the manner of a nozzle.

The laser ignition plug can be used in a versatile manner if the overflow ducts have geometries which differ from one another, at least in part. It is thus possible in a particularly simple manner to better match the shaping of the ignition torches with one another.

It is particularly simple to dimension the overflow ducts if a second cross-sectional area $Q_n$ of at least one second overflow duct is determined according to a first cross-sectional area $Q_1$ of a first overflow duct and a second path length $W_n$ starting from the antechamber along a longitudinal axis of the second overflow duct as far as a second wall portion of a combustion chamber wall, which is opposite the second overflow duct in the installed position of the laser ignition plug, and first path length W1 starting from the antechamber along a longitudinal axis of the first overflow duct as far as a first wall portion of the combustion chamber wall, which is opposite the first overflow duct in the installed position of the laser ignition plug in the internal combustion engine. A plurality or else all of the overflow ducts in the antechamber can thus be designed dependently on one another in accordance with the mechanical variables present and can thus be better matched to one another. The path lengths W1 and Wn are preferably determined starting from an outer opening in the overflow duct, and therefore a wall thickness of the antechamber is irrelevant to this.

In particular, in accordance with the disclosure, a quotient from the second cross-sectional area Qn and the first cross-sectional area Q1 is substantially proportional to a quotient from the second path length Wn and the first path length W1. A formula for calculating the cross-sectional areas of the overflow ducts can thus advantageously be provided, wherein any one of the overflow ducts arranged in the antechamber with its cross-sectional area Q1 and its path length W1 constitutes a reference for calculation of the other overflow ducts.

The formula is thus: $Qn=Q1*(Wn/W1)$, in which Qn and Wn each represent the values of any one of the other overflow ducts.

It is also proposed for the second cross-sectional area Qn according to the equation $Qn=Q1*(Wn/W1)^k$ to be dependent on the first cross-sectional area Q1, the first and second path length W1, Wn, and on a number k, wherein k>=0. The number k is an exponent. Written another way, the equation is thus as follows:

$$Qn = Q1 \cdot \left(\frac{Wn}{W1}\right)^k$$

A proportional (k=1), progressive (k>1) or degressive (0<k<1) relationship between the quotient from the second and first cross-sectional area Qn, Q1 and the quotient from the second and first path length Wn, W1 can thus advantageously be produced.

It is also proposed, in the case of a conical geometry of an overflow duct, for the cone to open towards an outer surface of the antechamber. This is particularly expedient if an outer opening in the overflow duct is arranged along the longitudinal axis of the overflow duct (in the installed position of the laser ignition plug in the internal combustion engine) so as to be closer to a wall area of the combustion chamber than is the case on average in each of the other overflow ducts. The ignition torch exiting from the antechamber can thus be expanded, wherein its effect decreases in the exiting direction thereof.

On the other hand, it is proposed for the cone to open towards an inner surface of the antechamber. This is particularly expedient if an outer opening in the overflow duct along the longitudinal axis of the overflow duct (in the installed position of the laser ignition plug in the internal combustion engine) is distanced farther from a wall area of the combustion chamber (combustion chamber wall) than is the case on average in each of the other overflow ducts. The ignition torch exiting from the antechamber can thus be bundled so to speak, wherein its effect increases in the exiting direction thereof and its length also increases in the direction of propagation.

In accordance with a further embodiment of the laser ignition plug, a cross-sectional area of at least one overflow duct is up to 10 square millimeters. As a rough reference value for overflow ducts of circular cross-section, the torch length of an ignition torch passing through increases up to a duct diameter of approximately 3 millimeters. As a result, a diameter range of the overflow ducts up to approximately 3 millimeters is particularly expedient. This corresponds approximately to a cross-sectional area of 7 square millimeters. In particular, depending on a specific design of an internal combustion engine, a diameter of the overflow ducts of approximately 1.2 millimeters up to approximately 2 millimeters can be particularly suitable.

Furthermore, a ratio of an area of an inner opening in the overflow duct to an area of an outer opening in the overflow duct is between 1:10 and 10:1. For overflow ducts of circular cross-section, a ratio of the openings is accordingly between approximately 1:3.16 and approximately 3.16:1. This is a particularly suitable range for forming overflow ducts having different areas of the inner opening and the outer opening.

In a further embodiment, the disclosure also takes into account the fact that a longitudinal section of at least one overflow duct may be parabolic or hyperbolic, at least in portions. Such geometries can be combined particularly effectively with conical geometries, that is to say fluidically expedient transitions between these geometries can be formed for an overflow duct.

In a further variant of the disclosure, the antechamber has a plurality of overflow ducts, which are arranged radially peripherally in an antechamber wall and which have different cross-sectional areas and/or geometries. A particularly versatile embodiment of the laser ignition plug according to the disclosure is thus enabled. In particular, overflow ducts can be arranged and aligned in all suitable spatial directions of the combustion chamber, wherein the embodiments of the ignition torches can also be formed individually by different cross-sectional areas and/or geometries.

It is understood that the described embodiments can advantageously also be combined with one another.

The laser ignition plug according to the disclosure may alternatively have an antechamber which comprises merely a single overflow duct. In accordance with the disclosure, the single overflow duct can likewise be aligned in different directions of the combustion chamber, wherein, in particular, it is not aligned coaxially with the longitudinal axis of the antechamber. Inter alia, any dirt particles or oil drops can thus only pass to a limited extent from the primary combustion chamber into the antechamber and, from there, reach a combustion chamber window in particular. The single overflow duct is preferably aligned in such a way that, in the installed position of the laser ignition plug in the internal combustion engine, it points in the direction of a comparatively far wall portion of the combustion chamber. In addition, its geometry can be formed in accordance with the embodiments of the above-described at least two overflow ducts. For example, the cross-sectional area and/or the cross-sectional shape along the longitudinal axis of the overflow duct can be different in order to fill the combustion chamber as uniformly as possible with the ignition torch exiting from the single overflow duct, wherein the respective path lengths between the outer opening in the overflow duct and wall portions of the combustion chamber are considered analogously to the previously described arrangements.

A key embodiment of the disclosure concerns an internal combustion engine having at least one laser ignition plug, in which the overflow ducts in the antechamber, with regard to the radial spacing thereof from a longitudinal axis of the antechamber and/or the axial spacing thereof from an end region, which faces the combustion chamber, of the antechamber and/or with regard to the alignment and/or geometry thereof, are arranged in such a way that ignition torches, exiting from the overflow ducts, of the ignited fuel reach wall portions of a combustion chamber basically at the same time, said wall portions being arranged in a primary direction of propagation of the ignition torches in question. In particular, this concerns the flame fronts exiting from the ignition torches, said flame fronts preferably reaching the wall portions of the combustion chamber at the same time. As a result of flows in the combustion chamber and as a result of a temperature distribution provided and/or a possible inhomogeneous fuel/air mixture, the flame fronts themselves often reach the wall portions at different times with an ideally symmetrical geometry of the combustion chamber. In accordance with the disclosure, not only is a provided combustion chamber geometry taken into account when designing the position, number, shape and alignment of the overflow ducts in the antechamber, but also the flows and the propagation of the flame fronts. For example, this may be carried out with the aid of a three-dimensional computer simulation. In this way, internal combustion engines can be ignited more uniformly by means of the laser ignition plug according to the disclosure, since the fuel ignited in a cylinder or combustion chamber thereof is burned through more uniformly and in particular more quickly, whereby the efficacy of the internal combustion engine can be optimized. Thermal losses in the cylinder wall and also a tendency for knocking of the internal combustion engine can also be reduced.

It is understood that the internal combustion engine according to the disclosure can be operated either with liquid or with gaseous fuels, and that the internal combustion engine can be provided either primarily for mobile use (motor vehicle) or stationary use, for example as a stationary large gas engine.

BRIEF DESCRIPTION OF THE DRAWINGS

Features which are key to the disclosure can also be found in the drawings hereinafter, wherein the features may be key to the disclosure both individually and in different combinations, without express reference again being made to this fact.

Exemplary embodiments of the disclosure will be explained hereinafter with reference to the drawing, in which.

DETAILED DESCRIPTION

Figure 1:
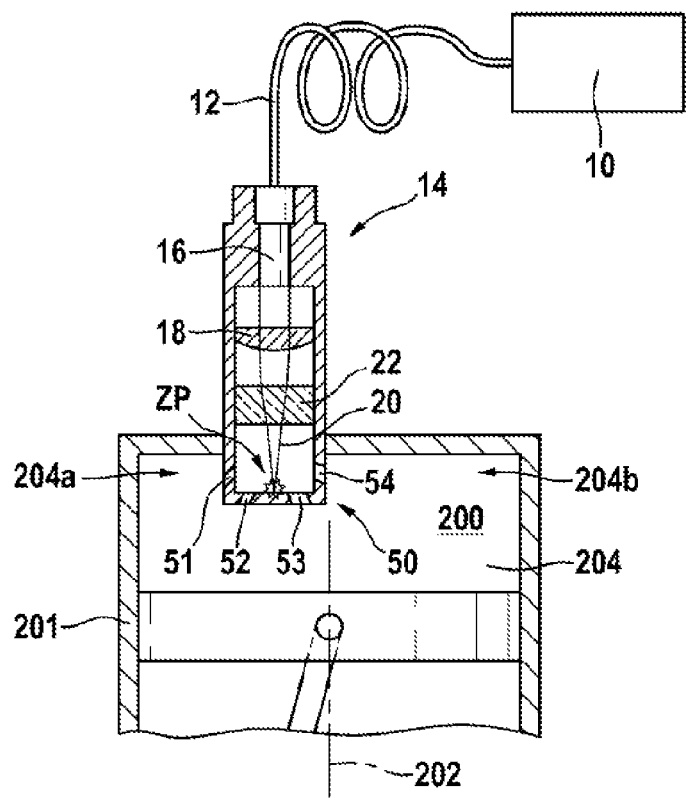
FIG. 1 shows a laser-based ignition system for an internal combustion engine of a motor vehicle having a laser ignition plug according to the disclosure.

Like reference numerals are used in all figures to denote functionally equivalent elements and variables, even in different embodiments.

FIG. 1 shows a laser-based ignition system for an internal combustion engine of a motor vehicle. The ignition system has a pump light source 10, which for example has a semiconductor diode laser in order to generate laser radiation to optically pump a laser device. The laser radiation generated by the pump light source 10 is forwarded via an optical waveguide device 12 to a laser device 16 integrated in a laser ignition plug 14. For example, the laser device 16 can be a laser-active fixed body with passive Q-switching (not shown), with which high-power laser radiation or laser impulses 20 can be generated in a manner known per se. When installed in the internal combustion engine, the laser ignition plug 14 projects in part into a combustion chamber 200 formed in a cylinder 201 or into a chamber region 204 formed therein and has four overflow ducts 51, 52, 53 and 54 over its portion projecting into the chamber region 204. For example, these overflow ducts are formed as bores with different alignments and diameters. In FIG. 1, the laser ignition plug 14 is formed in such a way that it forms an antechamber 50 by means of its portion projecting into the combustion chamber 200. The antechamber 50 therefore is not a separate individual part in the present case, but is integrated in the laser ignition plug 14. It is understood that the number of overflow ducts does not have to be four, as in the present case, but can be virtually any number, as will also be shown in the figures below.

The laser device 16 has a focusing optics 18 for focusing the laser impulses 20 on an ignition point ZP located in the antechamber 50 of the laser ignition plug 14. The ignition point ZP is preferably located inside the antechamber 50, that is to say not directly in the region of an inner surface of the antechamber wall. However, the ignition point ZP may also lie relatively tightly against the inner wall of the antechamber, or possibly also directly thereagainst. A combustion chamber window 22 is arranged between the focusing optics 18 and the antechamber 50.

It can be seen from FIG. 1 that, in the present case, the laser ignition plug 14 is not arranged coaxially along a longitudinal axis 202 of the cylinder 201 and of the combustion chamber 200, and therefore is assembled asymmetrically in the combustion chamber 200. The portion 204a of the combustion chamber 200 located to the left of the antechamber 50 in the drawing of FIG. 1 is thus smaller than the portion 204b of the combustion chamber 200 located to the right of the antechamber 50 in FIG. 1. The overflow ducts 53 and 54 therefore have a greater cross-section in accordance with the disclosure than the overflow ducts 51 and 52. The ignition torches exiting from the overflow ducts 53 and 54 are thus longer and can therefore contribute to a more uniform burn-through of the fuel located in the combustion chamber 200.

By contrast, in accordance with a further embodiment of the laser ignition plug 14 according to the disclosure, the laser ignition plug 14 or the antechamber 50 is arranged substantially coaxially with the longitudinal axis 202 of the cylinder 201 or of the combustion chamber 200; however a cavity, which faces the combustion chamber 200, of a piston is formed asymmetrically with respect to the longitudinal axis 202. As a result of the asymmetrical piston cavity, there is thus in actual fact an asymmetry of the combustion chamber with respect to the antechamber 50. The descriptions above can accordingly be transferred correspondingly to this embodiment. This is not also illustrated in the drawing of FIG. 1 however.

In accordance with a further embodiment of the laser ignition plug 14 according to the disclosure, the antechamber 50 terminates approximately flush with a wall portion of the combustion chamber 200. In this embodiment, the overflow ducts are distributed over an end face of the antechamber 50. This is not also illustrated in the drawing of FIG. 1 however.

Figure 2:
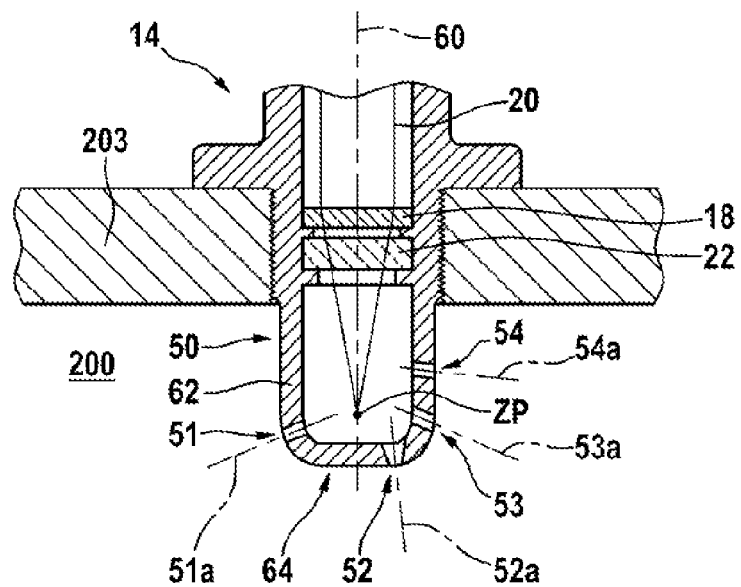
FIG. 2 shows an end portion, which faces the combustion chamber, of a further embodiment of the laser ignition plug according to the disclosure.

FIG. 2 shows a further embodiment of a laser ignition plug 14 according to the disclosure, said laser ignition plug being arranged over a portion of a cylinder head 203 and the embodiment being illustrated in an enlarged manner compared to FIG. 1. The laser ignition plug 14 and the combustion chamber 200 surrounding it are only illustrated in part. The overflow ducts 51, 52, 53 and 54 are formed as bores or openings in the present case, wherein the alignments thereof are described by longitudinal axes 51a, 52a, 53a and 54a illustrated in the drawing. The laser ignition plug 14 and also the antechamber 50 formed on the laser ignition plug 14 or an antechamber wall 62 are basically radially symmetrical about a longitudinal axis 60.

It can be seen that the overflow ducts 51 and 54 have approximately identical cross-sections, whereas the cross-section of the overflow duct 53 is larger. The overflow duct 52 is formed as a conical opening, which opens towards the inside of the antechamber 50.

FIG. 3, again, shows an enlarged illustration of an end region 64 of the antechamber 50 of the laser ignition plug 14 in an embodiment similar to FIG. 2. In the present case, the antechamber 50 has two overflow ducts 51 and 52, each of which is conical. The overflow duct 51 opens outwardly in the direction of the combustion chamber 200, whereas the overflow duct 52 opens inwardly in the direction of the antechamber 50. An outer opening 59a and an inner opening 59b are denoted in the example of the overflow duct 52. Furthermore, an outer surface 62a and an inner surface 62b of the antechamber wall 62 are described by reference signs.

Figure 3:
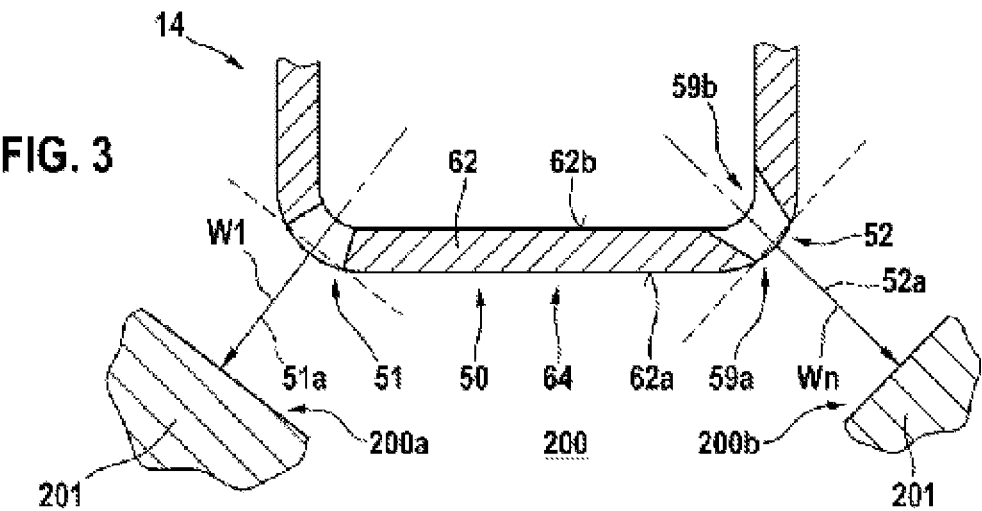
FIG. 3 shows an enlarged illustration of an end portion, which faces the combustion chamber, of a further embodiment of the disclosure.

The overflow duct 51 is aligned in the direction of a relatively close wall portion 200a of the cylinder 201 or of the combustion chamber 200 along a path length W1, and the overflow duct 52 is aligned in the direction of a relatively far wall portion 200b of the cylinder 201 or of the combustion chamber 200 along a path length Wn. For graphical reasons, the path lengths W1 and Wn in FIG. 3 are not illustrated to scale. The wall portions 200a and 200b are also merely illustrated schematically, wherein it is understood that the wall portions 200a and 200b do not necessarily have to be aligned in the manner selected randomly in the drawing.

Figure 4:
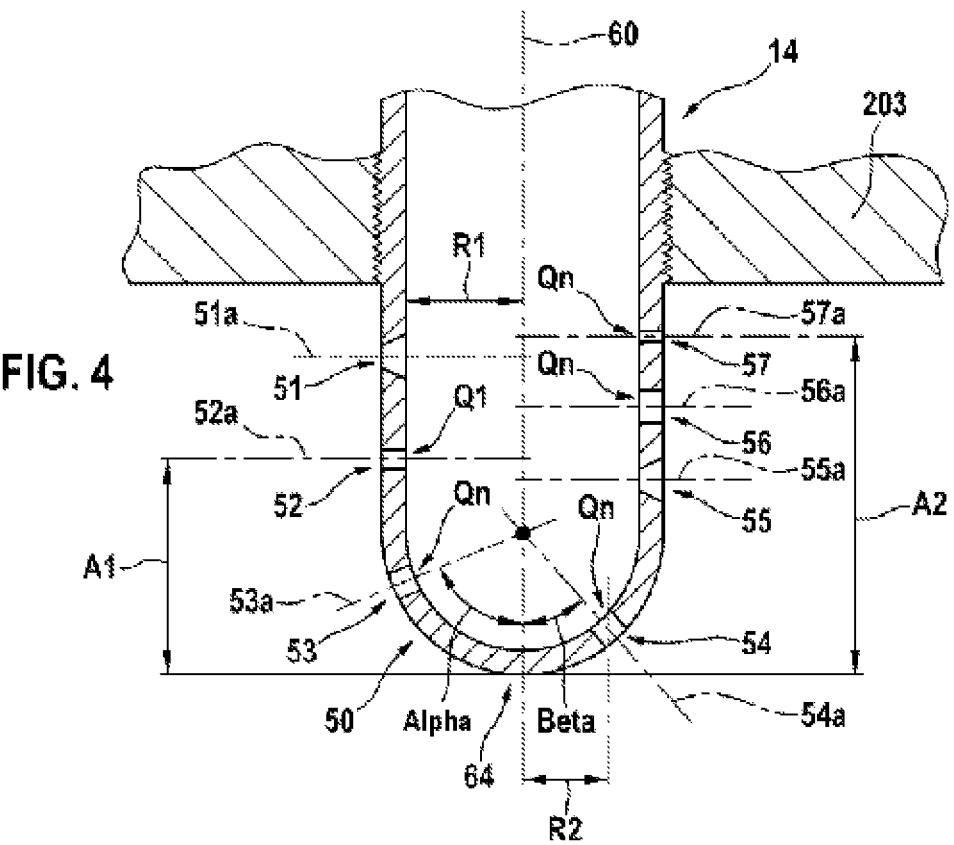
FIG. 4 shows an end portion, which faces the combustion chamber, of a further embodiment of the disclosure with a multiplicity of embodiments of overflow ducts.

FIG. 4 shows a selection of variants of overflow ducts. The laser ignition plug 14 and the cylinder head 203 are merely illustrated in part in the drawing. The illustrated arrangement of the overflow ducts 51, 52, 53, 54, 55, 56 and 57, including the longitudinal axes thereof 51a, 52a, 53a, 54a, 55a, 56a and 57a, illustrates a multiplicity of possibilities, wherein the combinations drawn in FIG. 4 are merely exemplary and do not necessarily also have to be expedient in the shown arrangement.

In the present case, all seven overflow ducts are formed as bores. The overflow duct 52 has a cross-sectional area Q1 and the overflow ducts 53, 54, 56 and have cross-sectional areas Qn deviating in part therefrom. For example, the overflow duct 52 is used as a reference for dimensioning the cross-sections Qn of the overflow ducts 53, 54, 56 and 57 in accordance with one of the following formulas:

$$Qn = Q1*(Wn/W1), \text{ or}$$

$$Qn = Q1*(Wn/W1)^k,$$

with path lengths W1 and Wn (not illustrated in FIG. 4) along the longitudinal axes 52a, 53a, 54a, 56a, and 57a between the overflow ducts 52, 53, 54, 56 and 57 and wall portions (not illustrated) of the cylinder 201 or of the combustion chamber 200. The number k is an exponent (k>=0). In the present case, the references Q1, Qn, W1 and Wn are used synonymously both as formula letters and as reference signs.

The above formulas represent a particularly suitable method for dimensioning the cross-sectional areas of the overflow ducts. By contrast, other values may of course be expedient for the cross-sectional areas.

Furthermore, the overflow ducts 51 and 52 have a different radial spacing R1 from the longitudinal axis of the laser ignition plug 14 compared to the overflow duct 54, which has a radial spacing R2. In addition, the overflow duct 52 has a different axial spacing A1 from the end region 64 of the laser ignition plug 14 compared to the overflow duct 57, which has an axial spacing A2. The overflow duct 53 is also aligned at an angle alpha to the longitudinal axis 60, and the overflow duct 54 is aligned with a slightly smaller angle beta. The overflow ducts 51 and 55 are conical, similarly to the example shown in FIG. 3.

Figure 5:
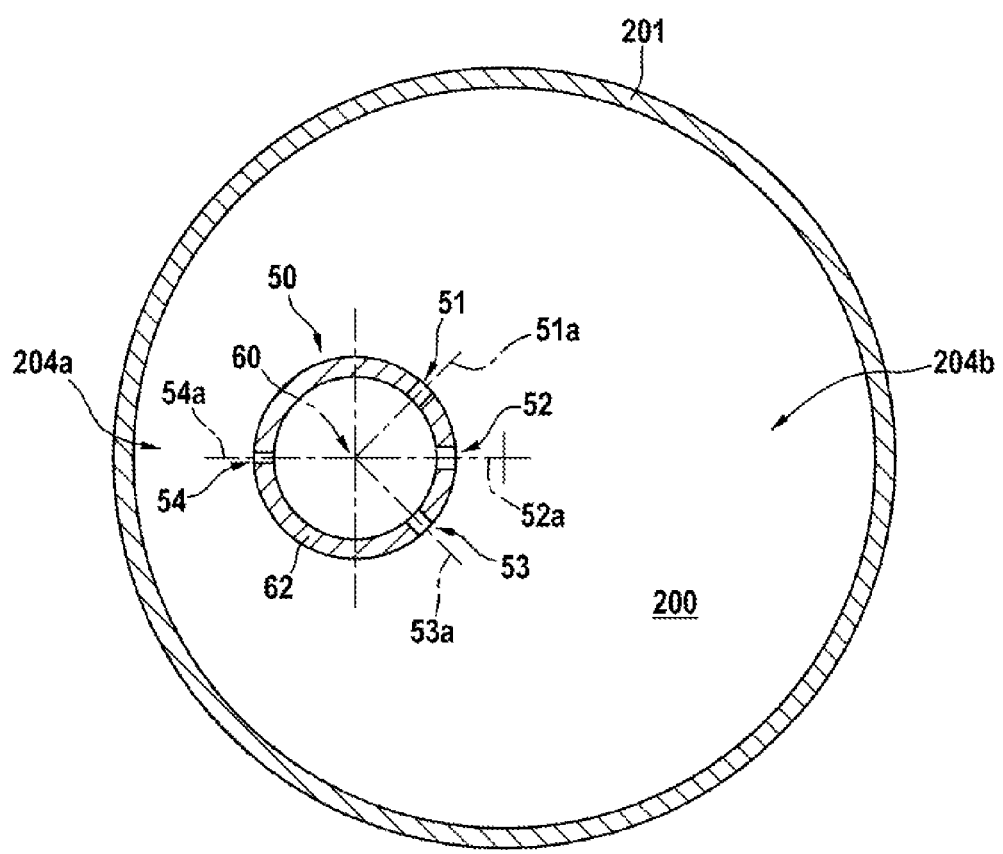
FIG. 5 shows a cross-section through an antechamber and a wall of a combustion chamber of a further embodiment of the disclosure.

FIG. 5 shows an axial cross-section through an antechamber 50 and through a wall of the cylinder 201. The plane of section is selected in such a way that four overflow ducts 51 to 54 are cut axially centrally and are thus visible. In FIG. 5, the four respective longitudinal axes 51a to 54a are also indicated.

An illustration comparable to FIG. 5 is also produced with use of a piston cavity formed asymmetrically to the longitudinal axis 202. This is not explained in greater detail in the present case however.

It can be seen that the overflow ducts 51 to 54 are not distributed uniformly along a circumference of the antechamber wall 62. The overflow duct 54 is aligned with its outer opening 59a over a portion 204a of the combustion chamber 200, and the overflow ducts 51 to 53 are aligned with their outer opening 59a over a portion 204b of the combustion chamber 200. The reference sign 59a is explained in greater detail in FIG. 3. The non-uniform distribution of the overflow ducts 51 to 54 can improve burn-though of the fuel located in the combustion chamber 200, since the smaller portion 204a can be ignited substantially by one overflow duct 54 and the larger portion 204b can be ignited substantially by three overflow ducts 51 to 53.

It can also be concluded that a cross-sectional area of the overflow duct 54 is to be made smaller than the respective cross-sectional areas of the overflow ducts 51, 52 and 53 so as to define a length of an ignition torch propagating in the direction of the longitudinal axis 54a.

In addition to the asymmetrical arrangements of the overflow ducts 51 to 57 presented in FIGS. 1 to 4 with regard to their radial and/or axial spacing, their alignment and their geometry, a further degree of freedom is also provided by an asymmetrical arrangement of the overflow ducts 51 to 57 in the axial plane of section. It is understood that the examples presented in FIGS. 1 to 5 can also advantageously be combined with one another.

As can be seen from FIGS. 1 to 5, the embodiments presented therein presuppose that the laser ignition plug 14 has to be installed positioned in the combustion chamber 200 or cylinder 201 if it is to be optimally effective.

The invention claimed is:

1. A laser ignition plug, comprising:
    an antechamber into which the laser ignition plug is configured to irradiate laser radiation,
    wherein the antechamber defines at least two overflow ducts, which form a fluid connection between the antechamber and a chamber region surrounding the antechamber,
    wherein the at least two overflow ducts, with regard to one or more of (i) the radial spacing thereof from a longitudinal axis of the antechamber, (ii) the axial spacing thereof from an end region, which faces the combustion chamber, of the antechamber, and (iii) the alignment and/or geometry thereof, are arranged and/or configured asymmetrically with respect to the longitudinal axis of the antechamber, and wherein a second cross-sectional area of at least one second overflow duct is determined according to:
a first cross-sectional area of a first overflow duct,
a second path length starting from the antechamber along a longitudinal axis of the second overflow duct as far as a second wall portion of a combustion chamber wall, which is opposite the second overflow duct in the installed position of the laser ignition plug in an internal combustion engine, and
a first path length starting from the antechamber along a longitudinal axis of the first overflow duct as far as a first wall portion of the combustion chamber wall, which is opposite the first overflow duct in the installed position of the laser ignition plug in the internal combustion engine.

2. The laser ignition plug as claimed in claim 1, wherein a cross-section of at least one overflow duct along a longitudinal axis of the overflow duct has one or more of different cross-sectional areas and cross-sectional shapes.

3. The laser ignition plug as claimed in claim 1, wherein at least one overflow duct has the geometry of a cone.

4. The laser ignition plug as claimed in claim 1, wherein the overflow ducts have geometries which at least partially differ from one another.

5. The laser ignition plug as claimed in claim 1, wherein a quotient from the second cross-sectional area and the first cross-sectional area is substantially proportional to a quotient from the second path length and the first path length.

6. The laser ignition plug as claimed in claim 1, wherein the second cross-sectional area (Qn) according to the equation $Qn=Q1*(Wn/W1)^k$ is dependent on the first cross-sectional area (Q1), the first and second path length (W1, Wn), and on a number k, wherein $k \geq 0$.

7. The laser ignition plug as claimed in claim 3, wherein the cone opens towards an outer surface of the antechamber.

8. The laser ignition plug as claimed in claim 3, wherein the cone opens towards an inner surface of the antechamber.

9. The laser ignition plug as claimed in claim 1, wherein a cross-sectional area of at least one overflow duct is up to 10 square millimeters.

10. The laser ignition plug as claimed in claim 1, wherein a ratio of an area of an inner opening of the overflow duct to an area of an outer opening of the overflow duct is between 1:10 and 10:1.

11. The laser ignition plug as claimed in claim 1, wherein a longitudinal section of at least one overflow duct is parabolic or hyperbolic, at least in portions.

12. The laser ignition plug as claimed in claim 1, wherein the antechamber has a plurality of overflow ducts, which are arranged radially peripherally in an antechamber wall and which have different cross-sectional areas and/or geometries.

13. An internal combustion engine, comprising:
at least one laser ignition plug having an antechamber into which the laser ignition plug is configured to irradiate laser radiation,
wherein the antechamber defines at least two overflow ducts, which form a fluid connection between the antechamber and a chamber region surrounding the antechamber,
wherein the overflow ducts in the antechamber, with regard to one or more of (i) the radial spacing thereof from a longitudinal axis of the antechamber, (ii) the axial spacing thereof from an end region, which faces the combustion chamber, of the antechamber, and (iii) the alignment and/or geometry thereof, are arranged in such a way that ignition torches of ignited fuel exiting from the overflow ducts reach wall portions of a combustion chamber at the same time, said wall portions being arranged in a primary direction of propagation of the ignition torches, and
wherein a second cross-sectional area of at least one second overflow duct is determined according to:
a first cross-sectional area of a first overflow duct,
a second path length starting from the antechamber along a longitudinal axis of the second overflow duct as far as a second wall portion of a combustion chamber wall, which is opposite the second overflow duct in the installed position of the laser ignition plug in the internal combustion engine, and
a first path length starting from the antechamber along a longitudinal axis of the first overflow duct as far as a first wall portion of the combustion chamber wall, which is opposite the first overflow duct in the installed position of the laser ignition plug in the internal combustion engine.

14. A laser ignition plug, comprising:
an antechamber into which the laser ignition plug is configured to irradiate laser radiation, the antechamber defining at least two overflow ducts that form a fluid connection between the antechamber and a chamber region surrounding the antechamber,
wherein a radial spacing of the at least two overflow ducts from a longitudinal axis of the antechamber is asymmetric and non-zero.

15. The laser ignition plug as claimed in claim 14, wherein the antechamber defines at least three overflow ducts arranged radially peripherally in an antechamber wall and equally spaced from an end region of the antechamber, a first circumferential spacing between a first overflow duct and a second overflow duct being less than a second circumferential spacing between a third overflow duct and either of the first and second overflow ducts.

* * * * *